Oct. 26, 1948.   W. A. PHILBIN   2,452,392
GLASS HANDLING DEVICE
Filed March 29, 1945   2 Sheets-Sheet 2
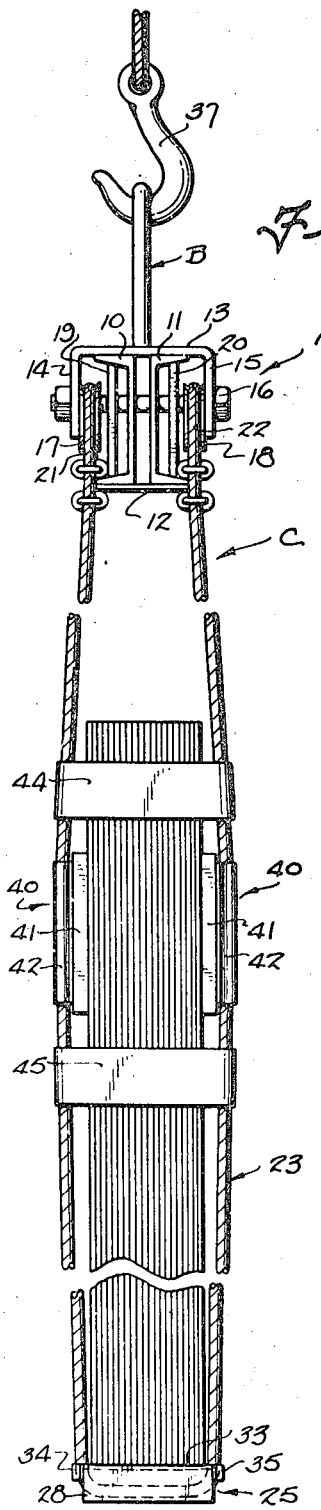
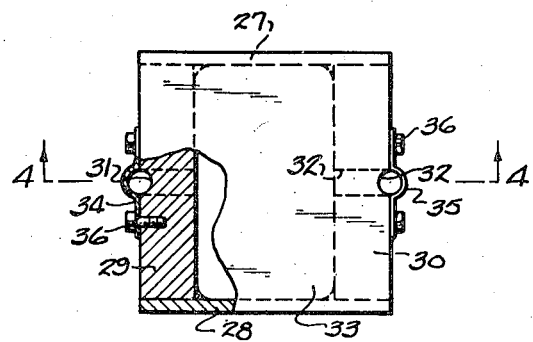
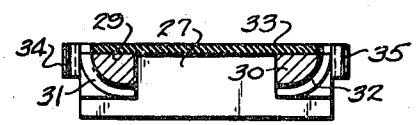
Inventor
WILLIAM A. PHILBIN.
By Frank Fraser
Attorney Patented Oct. 26, 1948

2,452,392

UNITED STATES PATENT OFFICE 2,452,392

GLASS HANDLING DEVICE

William A. Philbin, Perrysburg, Ohio, assignor to Libbey-Owens-Ford Glass Company, Toledo, Ohio, a corporation of Ohio Application March 29, 1945, Serial No. 585,521

3 Claims. (Cl. 294—74)

The present invention relates to the handling of sheets or plates. More particularly it has to do with the handling of glass, or other readily breakable sheets of large surface area, and to a special type of apparatus for this purpose.

Essentially, the apparatus of the invention comprises a yoke member, adapted to be suspended from a lifting means, such as an overhead crane; and a pair of slings, one hanging from each end of the yoke member and within which a plurality of large plates can be supported and carried. One specific use, in connection with which this device has proved to be particularly valuable, has to do with the transferring of huge plate glass blanks back and forth between so-called A frames, or bucks, and more permanent storage accommodations.

Today, most ground and polished plate glass is produced by first forming a continuous ribbon of glass in one of the well known types of plate glass rolling machines, then cutting this continuous ribbon up into so-called "blanks" as it emerges from the annealing leer of the machine, and finally passing the blanks through a continuous grinding and polishing line where they are ground, and subsequently polished, first on one side and then on the other.

Now while the plate glass blanks can be taken directly from the cutting table, at the end of the rolling machine, and placed on the grinding and polishing line, it is not practicable to depend on such a "hand to mouth" procedure in regular commercial production. Instead of a "bank" of glass blanks in so-called "dead storage" is maintained at all times. When surplus glass blanks are being produced by the rolling machine that cannot, for one reason or another, be immediately absorbed into the grinding and polishing line, these blanks are placed in the bank instead. On the other hand, when the glass rolling machine is shut down for repairs, a continuous flow of blanks to the grinding and polishing lines can still be maintained by withdrawing them from the bank.

In other words this bank, or glass stock pile, acts as sort of a safety valve between the machine and the lines to insure the smooth and most efficient operation of the whole at all times, and to offset the effects of a variety of adverse conditions that may be expected to arise during extended commercial production. For this reason it is extremely important that such a bank be established and maintained, and equally important that the extra handling of the glass sheets that is required to shift them into or out of the bank be done easily, economically and safely.

In actual practice, as the blanks are cut from the continuous ribbon of glass, coming out of the annealing leer of the plate glass forming machine, they are placed on A bucks that are positioned ready to hand. These bucks are simply padded, wooden frames of A shape, in vertical cross section, with a platform near the bottom along either side, upon which the glass plates stand on their bottom edges and lean against the slanting side portions of the frame. The bank is usually a storage room with two-by-fours laid at intervals along the floor. The glass sheets in the bank are placed with their lower edges on the spaced two-by-fours, and the first sheet in a stack is leaned against a frame or wall, while the succeeding sheets are placed one against the other in the same way that they are stacked on the side of an A buck.

Heretofore, plate glass blanks had to be moved from the bucks to the bank, one at a time, either by hand, or with an overhead suction frame. Subsequently, they had to again be moved, also one at a time, to take them out of the bank and put them back on an A frame. In either case, the handling procedure was a difficult, dangerous and expensive one. For one thing, these blanks are usually in the neighborhood of 150 square feet or more in area and, since they average around ¼ inch in thickness, each sheet will weigh anywhere from 350 to 750 pounds, or even more.

When these huge plates used to be transferred by hand it was a difficult and hazardous task for from two to six or more men, working in absolute unison and equipped with harness and lifting straps, to lift and move one of them successfully. They exhibit a surprising tendency to bend and flex unless the greatest care is observed and the slightest slip will almost certainly result in a serious accident. Moreover, since, in moving them by hand, at least some of the men were practically always working in a restricted area between the stacks, they had little or no chance to escape the dangerously large and sharp segments of flying glass when an accident did occur.

Even when, as has lately been the more usual practice, a vacuum frame operated from an overhead crane is used, there is still an element of danger. Also it is still a tedious and time-consuming procedure, because it is necessary to handle the blanks one at a time and, generally speaking, the space in which this work has to be done does not allow room for the effective use of such apparatus.

On the other hand, with the handling device of the present invention a whole group of blanks, in fact all that can be stacked on one side of an A frame, can be picked up by the yoke and sling assembly, hanging from an overhead crane, as a single bundle. Furthermore, this entire group of glass blanks, weighing as much as nine tons, can be deposited on the two-by-fours in the storage area in about the same time that it took to transfer a single blank by former methods. All without danger to, and with little or no effort on, the part of the operator.

Nevertheless it must not be assumed that the invention involves nothing more than the designing of a special type of handling device to accomplish a particular purpose. As a matter of fact, it is really based on an entirely new method of handling large plates of glass, because prior to the development of the procedure described in this application it had never been considered feasible to handle a plurality of glass plates or blanks of these sizes, except on bucks or racks.

Other objects and advantages of the invention will become more apparent during the course of the following description, when taken in connection with the accompanying drawings.

In the drawings, wherein like numerals are employed to designate like parts throughout the same:

Fig. 2 is an end view of the apparatus of Fig. 1 with portions broken out and removed;

Fig. 3 is a plan view of the plate carrying platform with the cable removed and portions broken away; and Fig. 4 is a section taken substantially on the line 4—4 in Fig. 3.

Figure 1:
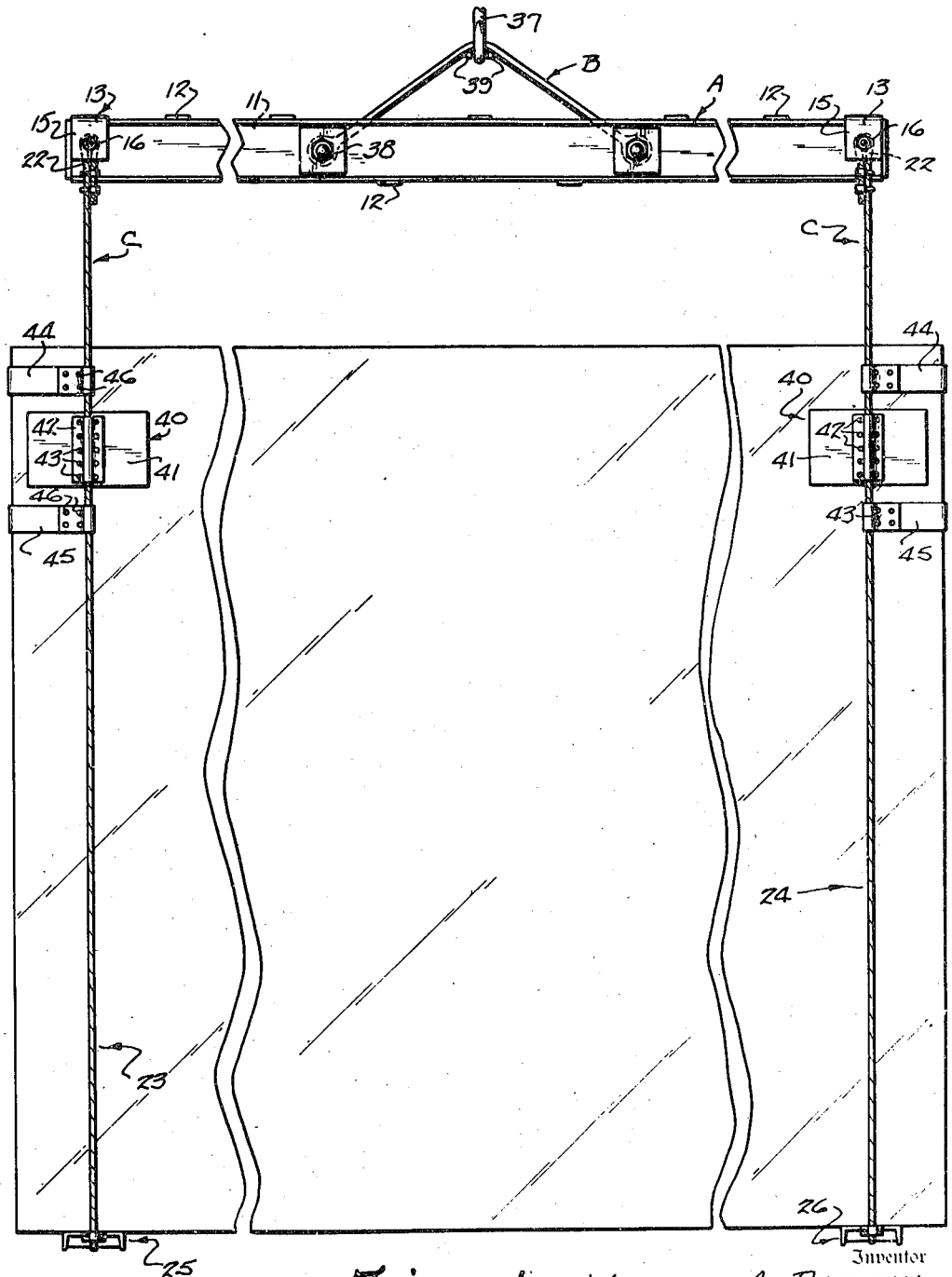
Fig. 1 is a side elevation of the glass handling device of this invention showing a plurality of glass sheets being carried thereby.

Referring now more particularly to the drawings, the handling device illustrated therein is made up primarily of a yoke member A, a bail member B and a pair of plate carrying slings C. The yoke A is preferably constructed of a pair of channel irons 10 and 11, arranged back to back and welded, or otherwise secured in spaced relation to one another, through the intermediary of cross members, or similar spacing means 12, as shown in Figs. 1 and 2.

Suspended in any suitable manner from the yoke A, adjacent its opposite ends, are the slings C, C. As shown, this may be done by means of U-shaped brackets 13, welded across the tops of the channel irons 10 and 11, so that they extend downwardly on either side of the yoke as at 14 and 15. Bolts 16 are passed through the legs 14 and 15 of the U-shaped members 13 and the webs of the channel irons 11 and 12, and each bolt carries a pair of wire rope thimbles 17 and 18 lying between the legs 14 and 15 and spacer plates 19 and 20 that are welded in the channels.

The slings C, C are each preferably made of a length of wire rope or cable formed with bights 21 and 22 at its opposite ends. When the bights 21 and 22 of a cable are passed around the thimbles 17 and 18 respectively, the cable will hang naturally in a suitable plate carrying loop as at 23 and 24.

To give the most satisfactory support to the lower edges of the glass plates to be handled, a pair of platforms 25 and 26 are provided to fit, one into each of the lower portions of these loops 23 and 24. If desired, instead of two platforms, a single long platform might be used with its opposite ends fitting into the loops 23 and 24. However, when two platforms are used, they may be constructed as illustrated in detail in Figs. 3 and 4. That is, with a pair of rectangular side pieces 27 and 28, between which extend two connecting members 29 and 30 which are of a shape similar to that of pieces of quarter-round molding. The arcuate portions of these pieces are positioned to form their outer sides and bottoms, and are grooved midway their ends as at 31 and 32 to receive the wire rope of one of the loops 23 and 24. A pad of rubber or similar soft and non-scratching material 33 is cemented to the top of the side pieces 27 and 28, and the members 29 and 30, so as to provide a solid top for the platform. As already stated the wire rope of the respective plate carrying sling fits into the grooves 31 and 32 when the platform is in place and, in order to hold the platform always in proper position, clamp plates 34 and 35, shaped to fit around the cable, are provided and secured to the platform by means of machine screws 36, in a manner to securely clamp the cable to the platform.

The yoke A is adapted to be suspended from the hook 37 of an overhead crane (not shown) by means of the bail B as illustrated in Figs. 1 and 2, the bail B being mounted between the channels 10 and 11 of the yoke A at exactly its mid portion, by means of the bolts 38. In order to insure the hook 37 of the crane being properly positioned to keep the yoke level, a pair of positioning lugs 39 are formed on or welded to the under side of bail B.

When it is desired to pick up a plurality of glass plates and transfer them from one place to another, it is only necessary to lower the crane hook 37 so that the loops 23 and 24 of the slings C can be passed around the opposite ends of the group of plates, as shown in Fig. 1. At this time, the bottom edges of the glass plates will be resting on the pad 33 of the platforms 25 and 26, and when the crane hook is lifted the entire group of sheets will be picked up and can be moved and deposited in any position desired.

It will be seen from Fig. 2 that the width of the platforms 25 and 26 will prevent the wire cables of the slings C from engaging the bottom outside corners of the two outside glass plates carried by the slings. In order to also keep these cables from contacting either the faces, or the upper outside corners, of the outside sheets a pair of inwardly facing cushioning members 40 are secured to the cables at either side of the loop in a position to contact the outer glass sheet adjacent its upper edge. In addition to protecting the outer sheets from contact with the wire rope, the cushioning members 40 also act to more evenly distribute the inwardly directed pressure or squeezing action exerted on the blanks by the loops 24 and 25, upon lifting of the crane. The squeezing or gripping pressure, when transmitted by the cushioning members 40, will act to effectively retain the blanks in position in the slings.

Each of the cushioning means 40 preferably consists of a block of plywood 41, that may or may not be padded, and a clamping member 42 that fits around the cable and holds the block 41 tightly thereto by means of the screws 43.

As a further precautionary measure, to prevent the glass plates from sliding lengthwise out of the loops 23 and 24, a pair of strap members 44 and 45 are secured to the cables across each loop, above and below the cushioning means 40. These straps are secured in proper position on the cables by wrapping the ends around the cable and then riveting the contacting portions of the strap together as at 46.

As pointed out above, the slings C can be put in place by simply sliding the loops 23 and 24 over the ends of the group of glass plates to be handled. With A frames of standard design, and slightly shorter than the glass plates are long, there is plenty of room to engage and disengage the slings from the glass sheets. Similarly, when a group of sheets have been deposited on the two-by-fours in the dead storage, the platforms 25 and 26 are made of such size that they can be readily slid under or out from under the glass plates, upon releasing of the load, when the cable hook 37 is lowered.

In stacking the groups of glass sheets in the dead storage, it is customary to use two-by-fours placed upright as spacers between adjacent groups of plates. In this way, a group that has been taken from one side of a buck will be separated from the others and each group can be picked up as a separate unit when it comes time to remove it from storage and place it on an A frame for transfer to the grinding and polishing line.

The slings C should be pushed over the ends of the sheets until the straps 44 and 45 are taut against the ends of the sheets. When this has been done, upon raising of the crane hook 37, to put the load on the yoke, the cushioning plates 40 will be urged into snug engagement with the outer surfaces of the outer glass plates and the entire assembly of sheets can be safely lifted and maneuvered as desired.

It is to be understood that the form of the invention herewith shown and described is to be taken as a preferred embodiment of the same, and that various changes in the shape, size and arrangement of parts may be resorted to without departing from the spirit of the invention or the scope of the subjoined claims.

I claim:

1. A device for handling glass plates of large surface area comprising a yoke member, means for attaching said yoke to an overhead lifting and traveling mechanism, a pair of looped plate carrying cables suspended one from each end of said yoke member, a platform member shaped to fit into the loop of each of said cables for supporting the bottom edges of the plates, means for maintaining said cables in spaced relation to the faces of said plates, and means for retaining said plates within said loops.

2. A device for handling glass plates of large surface area comprising a yoke member, means for attaching said yoke to an overhead lifting and traveling mechanism, a platform for supporting the bottom edges of the plates to be handled, cables for suspending said platform from said yoke, cushioning blocks carried by said cables to lie against the face of said glass plates, and plate engaging means extending from said cables around the edges of said plates for retaining them on said platform.

3. A device for handling glass plates of large surface area comprising a yoke member, means for attaching said yoke to an overhead lifting and traveling mechanism, a pair of looped plate carrying cables suspended from said yoke member, a platform member shaped to fit into the loop of each of said cables for supporting the bottom edges of the plates to be handled, cushioning blocks carried by the cables and engageable with the outer surfaces of said plates adjacent their upper edges, and straps adapted to extend between the loops of each of the cables around the ends of the plates for retaining them on said platform.

WILLIAM A. PHILBIN.

REFERENCES CITED

The following references are of record in the file of this patent:

UNITED STATES PATENTS

| Number | Name | Date |
|---|---|---|
| 379,870 | Hohorst | Mar. 20, 1888 |
| 541,120 | Root | June 18, 1895 |
| 1,436,151 | Carstarphen | Nov. 21, 1922 |
| 1,522,707 | Andrews et al. | Jan. 13, 1924 |
| 2,131,406 | Mosmieri et al. | Sept. 27, 1938 |

FOREIGN PATENTS

| Number | Country | Date |
|---|---|---|
| 525,948 | Great Britain | Sept. 6, 1940 |